United States Patent [19]
Hartley

[11] 4,414,697
[45] Nov. 15, 1983

[54] TOOL FOR FIBER OPTIC CABLE CLAMP

[75] Inventor: James T. Hartley, Santa Ana, Calif.

[73] Assignee: International Telephone and Telegraph Corporation, New York, N.Y.

[21] Appl. No.: 308,774

[22] Filed: Oct. 5, 1981

[51] Int. Cl.³ .................. B25F 1/00; B23P 19/04; B21F 3/00
[52] U.S. Cl. .................................. 7/107; 29/282; 140/124
[58] Field of Search ............... 140/117, 118, 120, 124; 7/107; 29/270, 278, 280, 282, 240; 81/3 R, 3 J, 124.1, 121 A, 90 D; 269/203

[56] References Cited
U.S. PATENT DOCUMENTS

| 669,282 | 3/1901 | Lanpher | 269/203 X |
| 2,701,493 | 2/1955 | Briglia | 81/124.1 |
| 2,811,883 | 2/1957 | Cleaves | 81/124.1 |
| 3,071,995 | 1/1963 | Ruthrauff, Jr. | 81/121 A X |
| 3,168,118 | 2/1965 | Holman | 140/118 |
| 3,434,511 | 3/1969 | Mixon, Jr. | 140/117 |

Primary Examiner—James L. Jones, Jr.
Assistant Examiner—Debra S. Meislin
Attorney, Agent, or Firm—T. E. Kristofferson; T. L. Peterson

[57] ABSTRACT

A tool is disclosed for helically winding the strength member of a fiber optic cable around a clamp sleeve and thereafter pushing a crimp sleeve over the helically wound strength member while holding the strength member in place on the clamp sleeve.

8 Claims, 9 Drawing Figures

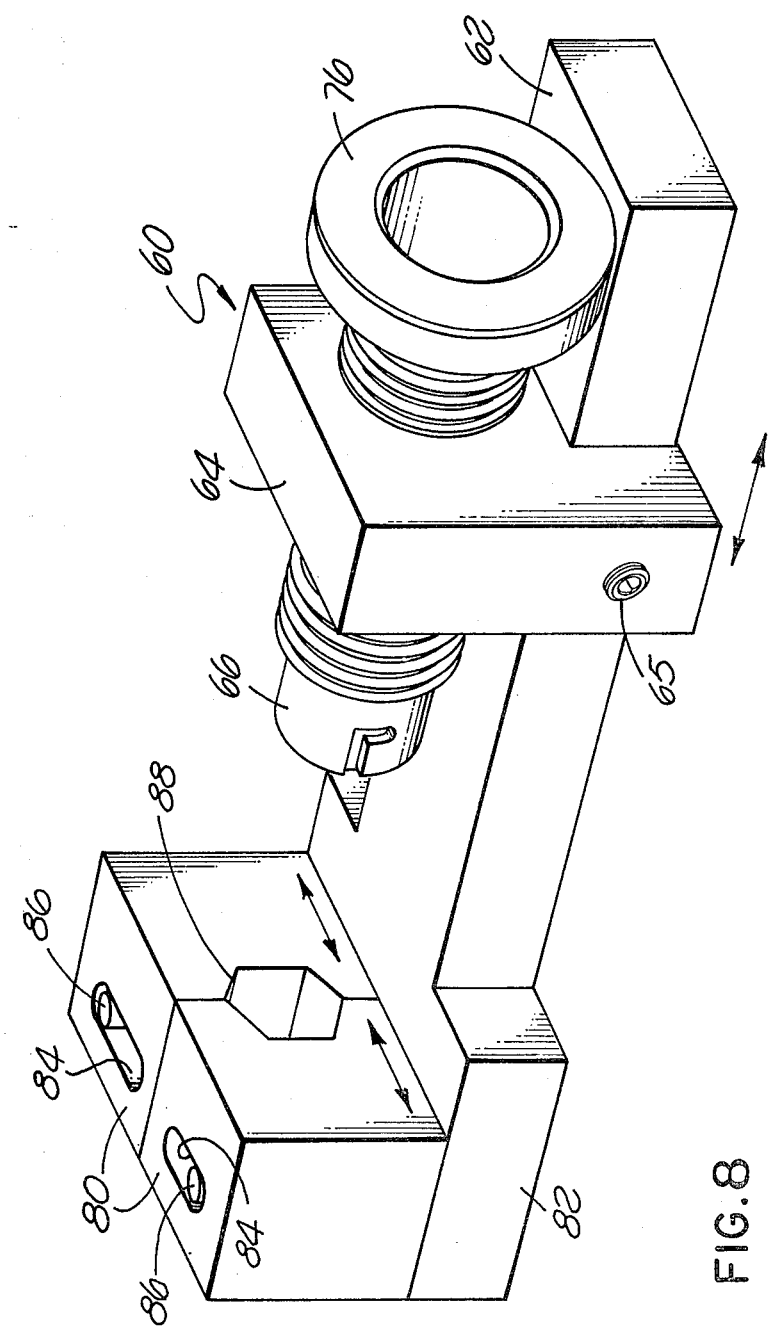

TOOL FOR FIBER OPTIC CABLE CLAMP

BACKGROUND OF THE INVENTION

The present invention relates generally to a cable clamp and, more particularly, to a tool for facilitating the clamping of the strength member of a fiber optic cable to a sleeve which is mounted in a fiber optic connector.

In copending application of L. M. Borsuk et al. entitled "Fiber Optic Cable Clamp", Ser. No. 308,518, filed concurrently herewith, there is disclosed a clamp for a fiber optic cable having metal strength members. The strength members are fed through axial slots in the forward end of an inner sleeve of the clamp and are wound helically around the inner sleeve. Thereafter, an outer sleeve is crimped around the helically wound portions of the strength members and the inner sleeve to tightly secure the strength members to the sleeve.

Because the wire strength members are relatively stiff, when helically wound around the inner sleeve of the clamp they tend to spring back making it somewhat difficult to push the outer sleeve over the wound strength members.

It is the object of the present invention to provide a tool which facilitates the assembly of the outer crimp sleeve of the clamp while holding the helically wound strength members in place on the inner sleeve of the clamp.

SUMMARY OF THE INVENTION

According to a principal aspect of the present invention, there is provided a tool for a fiber optic cable strength member clamp comprising a cylinder adapted to slidably receive therein the outer crimp sleeve for the clamp. A plunger is slidably mounted in the rear of the cylinder and is adapted to engage one end surface of the sleeve for ejecting the sleeve outwardly through the forward end of the cylinder. An axially extending slot is formed in the cylinder opening at the forward end thereof. The slot is dimensioned to slidably receive the strength member which extends outwardly through the axial slot in the inner sleeve of the clamp when the tool is initially positioned over the inner sleeve. Means is provided for rotating the cylinder around its longitudinal axis to helically wind the cable strength member around the inner sleeve of the clamp. After the winding operation is completed, the plunger is pushed forwardly to shift the outer crimp sleeve over the helically wound strength member while the latter is firmly held in place. The tool is then removed from the clamp assembly so that the outer sleeve may be crimped around the helically wound strength member and inner sleeve.

BRIEF DESCRIPTION OF THE DRAWINGS

FIG. 8 is a perspective view of an alternative embodiment of the tool of the present invention mounted on a frame carrying a crimp die.

DESCRIPTION OF THE PREFERRED EMBODIMENTS

Figure 1:
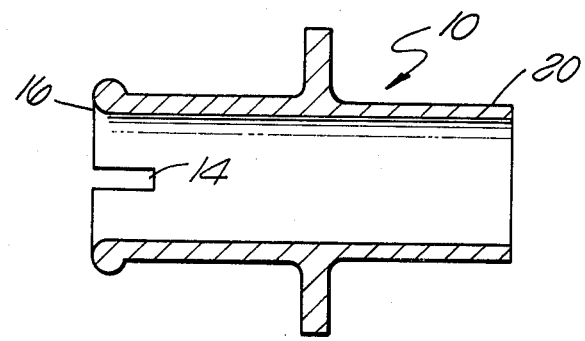
FIG. 1 is a longitudinal sectional view through the inner sleeve of the cable clamp with which the tool of the present invention is utilized.
Figure 2:
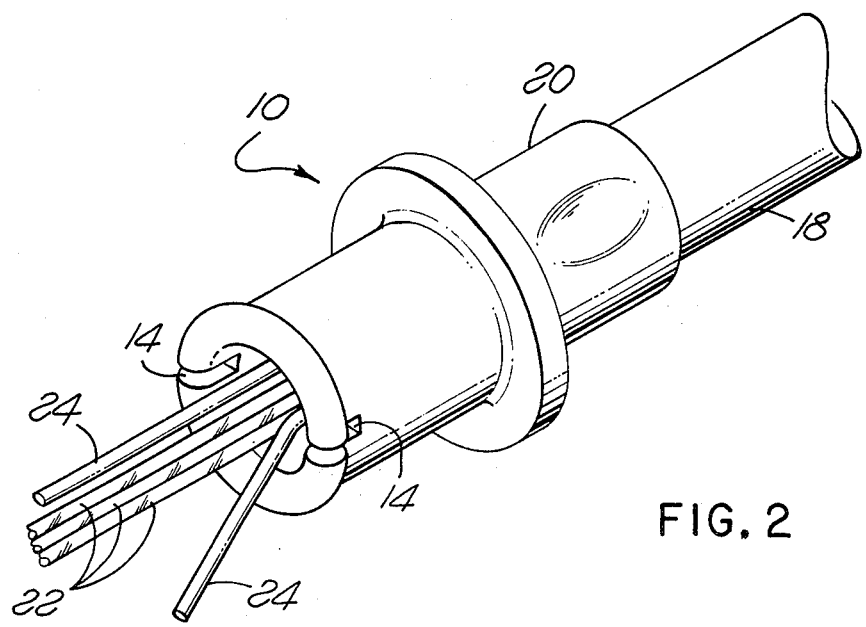
FIG. 2 is a perspective view showing a fiber optic cable extending through the rear of the inner sleeve illustrated in FIG. 1.
Figure 3:
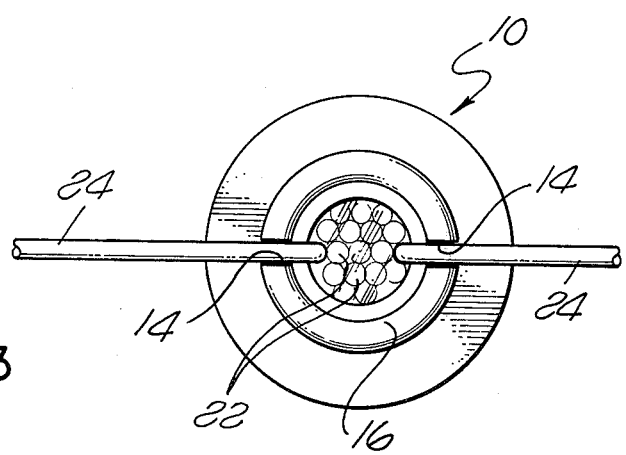
FIG. 3 is a front end view of the assembly illustrated in FIG. 2 showing the strength members of the cable extending outwardly through slots formed in the forward end of the inner sleeve.
Figure 4:
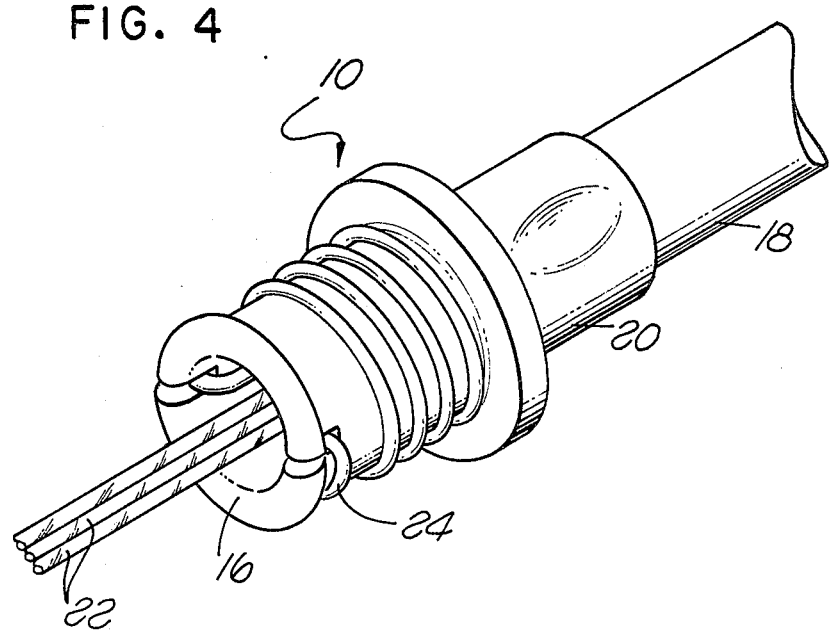
FIG. 4 is a perspective view similar to FIG. 2 showing the strength members of the cable helically wound around the forward portion of the inner sleeve.
Figure 5:
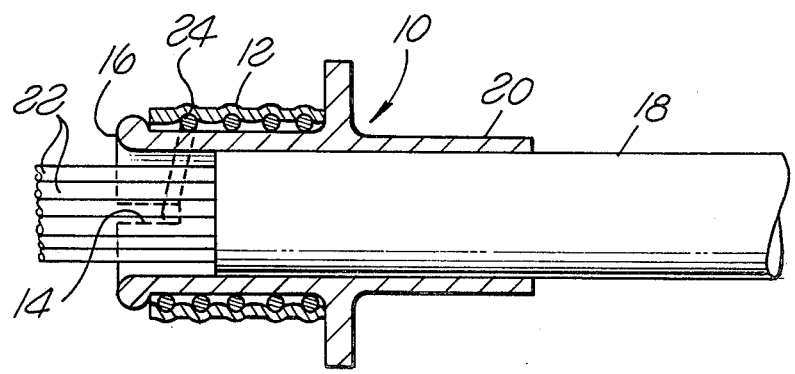
FIG. 5 is a longitudinal sectional view of the completed cable clamp showing the outer sleeve crimped over the helically wound strength members and inner sleeve.

Referring now to FIGS. 1–5 of the drawings, the cable clamp with which the tool of the present invention is utilized includes an inner sleeve 10 and an outer crimp sleeve 12. A pair of axially extending slots 14 are formed in the forward portion of the inner sleeve opening at the front edge 16 thereof. As seen in FIG. 1, a fiber optic cable 18 is initially inserted through the rear portion 20 of the inner sleeve exposing optical fibers 22 and two wire strength members 24 at the front of the sleeve. The wires 24 are fed outwardly through the axially extending slots 14 in the sleeeve as illustrated in FIG. 3 and thereafter are helically wound around the forward portion of the sleeve as seen in FIG. 4. Then the outer sleeve 12 is slid over the helically wound wires and crimped thereon as shown in FIG. 5 and described in detail in the aforementioned copending application of Borsuk et al.

Figure 6:
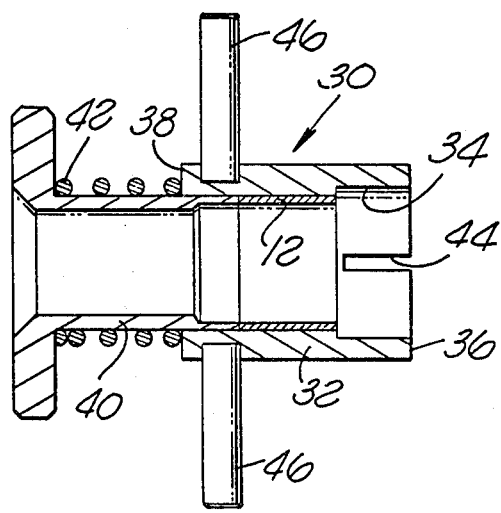
FIG. 6 is a longitudinal sectional view through one embodiment of the tool of the present invention for helically winding the strength members around the inner sleeve and positioning the outer sleeve thereover in the clamp illustrated in FIGS. 1–5.
Figure 7:
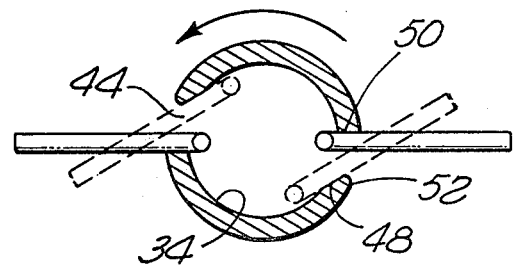
FIG. 7 is a transverse sectional view through the forward portion of the tool illustrated in FIG. 6 showing in full lines the position of the strength members of the fiber optic cable when the tool is first positioned over the inner sleeve of the clamp, and showing in phantom lines the position of the strength members after the tool is rotated in the counter clockwise direction as viewed in the figure.

In accordance with the present invention, a tool is provided which facilitates the helical winding of the wires of the fiber optic cable around the inner sleeve and assembly of the outer crimp sleeve thereover while the wires are held in place. FIGS. 6 and 7 show one alternative embodiment of the tool of the present invention, generally designated 30. The tool comprises a cylinder 32 having a bore 34 extending from the forward end 36 to the rear end 38 of the cylinder. The bore is dimensioned to slidably receive the outer crimp sleeve 12 in its intermediate portion. A plunger 40 is slidably mounted in the rear end of the tool. A coil spring 42 serves to bias the plunger 40 in the rearward direction. Means, not shown, prevents the plunger from sliding out of the end of the cylinder.

A pair of axially extending diametrically opposed slots 44 are formed in the forward portion of the cylinder 32 opening at its forward end 36. The width of each slot is selected to slidably receive one of the wire strength members 24 of the cable 18. A pair of radially extending rods 46 are mounted on the rear portion of the cylinder 32 which provide a handle for rotating the tool about its longitudinal axis.

To use the tool, initially the wire strength members 24 of the cable are fed outwardly through the slots 14 in the inner sleeve as described previously. Then the tool is positioned to align the slots 44 of the cylinder 32 with the slots 14 in the inner sleeve, and the tool is pushed forwardly over the inner sleeve until the bottoms of the slots 44 engage the strength members. Thereafter the tool is rotated about its longitudinal axis by the handle rods 46 to helically wrap the strength members around the inner sleeve. Then the plunger 40 is pushed forwardly to slide the outer crimp sleeve 12 over the helically wound strength members as the latter are held tightly in place by the tool around the inner sleeve. Thereafter the tool is removed from the cable clamp sleeves, and the outer sleeve is crimped by a suitable crimping tool around the helically wound strength members and the inner sleeve.

Preferably, before winding the strength members of the cable around the inner sleeve by the tool 30, the rear portion 20 of the inner sleeve is crimped upon the outer jacket of the cable 18. Thus, when the tool is rotated to wind the strength members around the forward portion of the inner sleeve, the strength members will be wound under tension thereby removing any slack that might otherwise exist in the strength members of the cable so that when the completed cable clamp assembly is mounted in a fiber optic connector body, not shown, no movement of the strength members will occur and, therefore no tension is applied to the optical fibers of the cable when a tension load is applied to the cable.

As best seen in FIG. 7, preferably one longitudinal edge 48 of each slot 44 extends tangentially to the wall of the bore 34 in the tool cylinder 32. The opposite edge 50 of each slot extends radially. Preferably the junction of the tangential edge 48 and the outer surface of the cylinder 32 is rounded as indicated at 52 so that a sharp edge will not engage the wire strength members of the cable. When the tool is rotated in the counterclockwise direction as indicated by the arrow in FIG. 7, the position of the strength members will change from that shown in full lines to that shown in phantom lines wherein the strength members will lie along the tangential edges 48 of the slots which facilitates helically winding of the strength members around the inner sleeve of the cable clamp.

Figure 9:
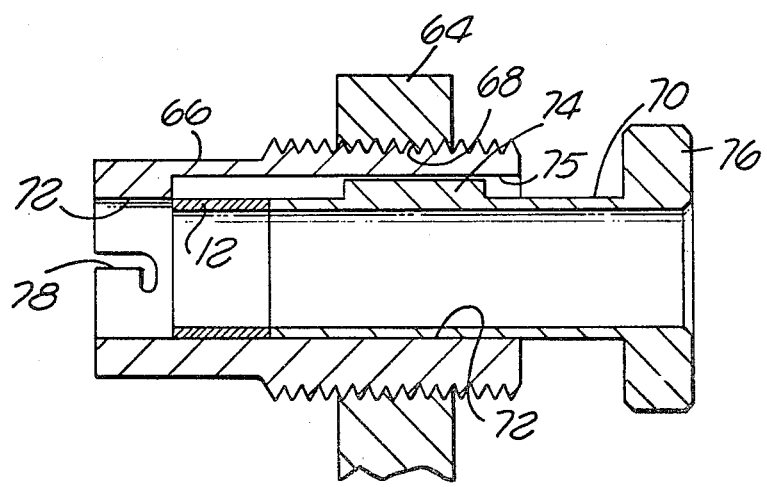
FIG. 9 is a fragmentary sectional view of the tool illustrated in FIG. 8.

Reference is now made to FIGS. 8 and 9 which illustrate a second embodiment of the tool of the present invention, generally designated 60, which is mounted on an elongated frame 62. More specifically, the tool comprises a bracket 64 which is slidable on the frame 62 and is fixed to the frame in any desired position by a pair of set screws 65 on opposite sides of the frame, only one being visible in FIG. 8. The cylinder 66 of the tool is threaded in a threaded bore 68 in bracket 64 which is parallel to the longitudinal axis of the elongated frame 62. A plunger 70 is axially slidable in the bore 72 in the cylinder 66 but is non-rotatable relative thereto by virtue of a key 74 which slides into a keyway 75 formed in the wall of the bore. A handle 76 is formed on the rear of the plunger. The forward end of the cylinder is formed with a pair of diametrically opposed slots 78 which have an L-shape configuration, and are dimensioned to slidably receive therein the strength members of the fiber optic cable. The bore 72 receives the outer crimp sleeve 12 of the cable clamp assembly in front of the plunger 70 as in the tool 30.

A pair of crimp dies 80 are mounted on the end 82 of the frame 62. The crimp dies have vertical slots 84 therethrough which receive guide pins 86 which are fixed to the end 82 of the frame so that the dies may shift laterally relative to the longitudinal axis of the frame. Recesses are formed on the opposed faces of the crimp dies 80 forming a hexagonal shaped opening 88 which is coaxial with bore 72 in tool 60.

To utilize the tool illustrated in FIGS. 8 and 9, the fiber optic cable is positioned in the inner sleeve of the cable clamp as illustrated in FIG. 2, and the assembly is located between the crimp dies in the opening 88. The dies 80 are then pushed toward each other to crimp the rear portion 20 of the inner sleeve on the outer cable jacket. The strength members of the cable are then fed through the slots in the forward portion of the inner clamp sleeve, as described previously, and then the bracket 64 is pushed forwardly on the frame 62 to position the strength members in the slots 78 of the tool 60. The bracket is then fixed in place on the frame 62 by the set screws 66. The handle 76 of the tool is then rotated which causes the cylinder 66 to rotate and advance in the bracket in a uniform, controlled manner due to the threaded connection between the cylinder and the bracket, which provides a uniform helical winding of the strength members around the inner sleeve of the clamp. Thereafter the plunger 70 is pushed forwardly to slide the outer sleeve 12 around the helically wound strength members on the inner sleeve. The bracket 64 is then retracted on the frame 62 and the outer sleeve of the cable clamp is crimped around the helically wound strength members and the inner sleeve by a separate crimp tool.

Thus, by the present invention there is provided a simple and inexpensive tool which facilitates the assembly of the outer sleeve around the helically wound strength members on an inner sleeve while the strength members are firmly held in place by the tool.

What is claimed is:

1. A tool for a fiber optic cable strength member clamp comprising:

a cylinder having a forward end and a rear end, said cylinder being adapted to slidably receive therein a crimp sleeve for said clamp having a predetermined length;

a plunger slidably mounted into the rear end of said cylinder having a forward end adapted to engage one end surface of the sleeve for ejecting the sleeve outwardly through said forward end of said cylinder, said plunger normally being in a retracted position;

an axially extending open slot in said cylinder opening at its forward end, said slot being dimensioned to receive a cable strength member therein;

said forward end of said plunger when in its retracted position being spaced behind the inner end of said slot a distance at least as great as said predetermined length; and means for rotating said cylinder around its longitudinal axis for helically winding a cable strength member extending outwardly through said slot.

2. A tool as set forth in claim 1 wherein:
said cylinder contains two of said slots diametrically opposed to each other.

3. A tool as set forth in claim 1 wherein:
said slot is defined by two longitudinally extending edges; and
one of said edges extending radially and the other edge extending tangentially relative to the inner cylindrical surface of said cylinder.

4. A tool as set forth in claim 1 including:
a bracket having a threaded bore therethrough; and
said cylinder is threadedly engaged in said bore for controlled, uniform rotation of said cylinder around its longitudinal axis and axial movement of said cylinder.

5. A tool for a fiber optic cable strength member clamp comprising:
a frame having a bracket and holding means thereon, said holding means being spaced from said bracket and having an opening therein adapted to receive a fiber optic cable having a cable clamp sleeve thereon;
said bracket having a threaded bore therethrough coaxial with the center axis of said opening;
a cylinder having a forward end extending toward said holding means and a rear end, said cylinder being adapted to slidably receive therein a crimp sleeve for said clamp;
said cylinder being threadedly engaged in said bore for controlled, uniform rotation of said cylinder around its longitudinal axis and axial movement of said cylinder toward said holding means;
a plunger slidably mounted into the rear end of said cylinder adapted to engage one end surface of the sleeve for ejecting the sleeve outwardly through said forward end of said cylinder;
an axially extending slot in said cylinder opening at its forward end, said slot being dimensioned to receive a cable strength member therein; and
means for rotating said cylinder in said bore for helically winding a cable strength member extending outwardly through said slot and simultaneously advancing said cylinder through said bore toward said holding means.

6. A tool as set forth in claim 5 wherein:
said holding means is a crimp die.

7. A tool as set forth in claim 5 wherein:
said plunger and said cylinder have an axially sliding but non-rotatable connection therebetween; and p1 said rotating means is formed on said plunger whereby rotation of said plunger causes said cylinder to rotate in said bracket bore so that said cylinder may advance through said bore.

8. A tool as set forth in claim 5 including:
means for adjusting said bracket on said frame axially relative to said holding means.

* * * * *